July 16, 1946.  D. G. HUNTER  2,404,291
ROLL-FILM WINDING MECHANISM
Filed April 12, 1944  3 Sheets-Sheet 1
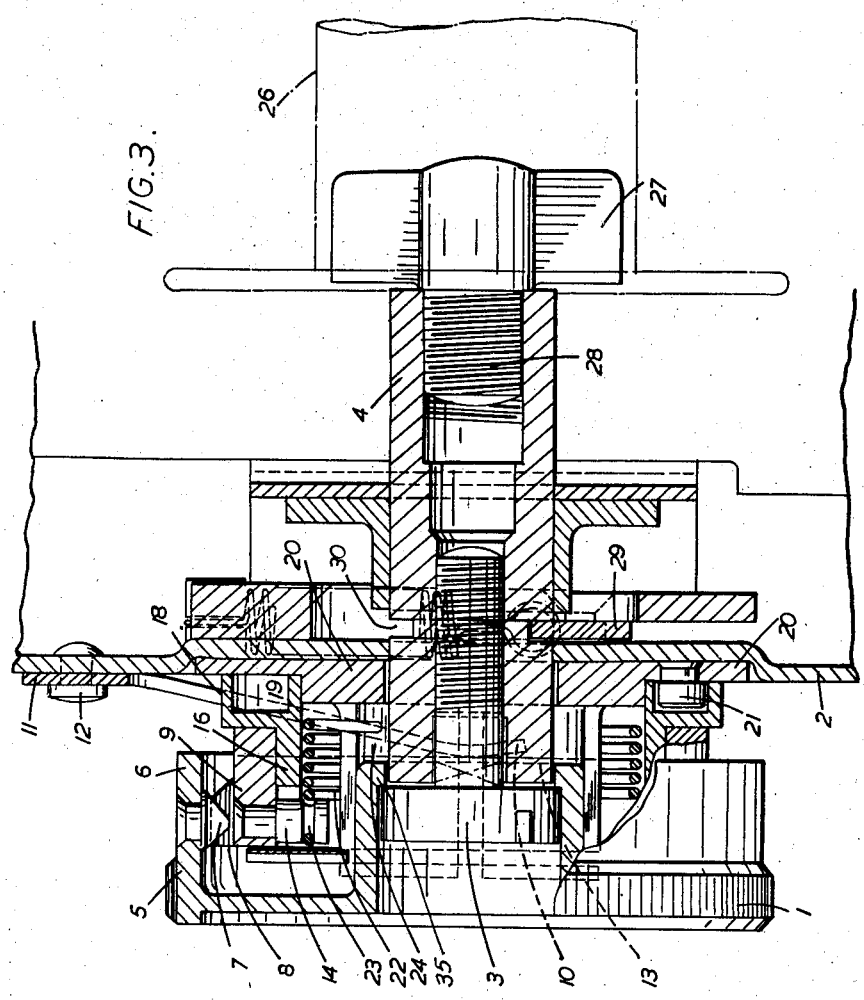
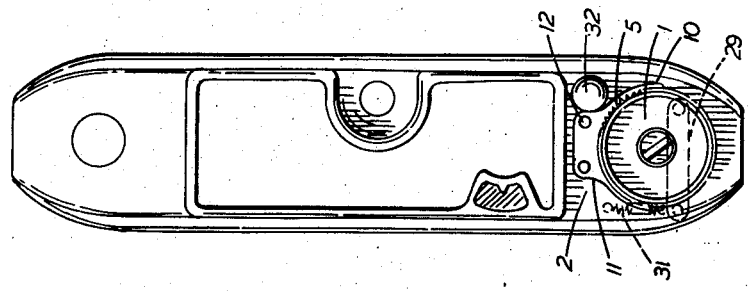
Inventor
Douglas Gordon Hunter
By
Attorney July 16, 1946.                D. G. HUNTER                2,404,291
                        ROLL-FILM WINDING MECHANISM
                        Filed April 12, 1944        3 Sheets-Sheet 2
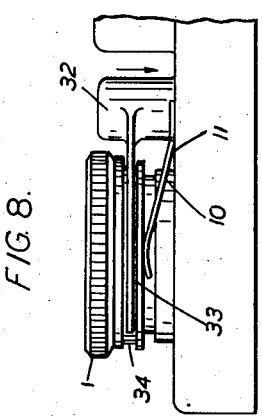
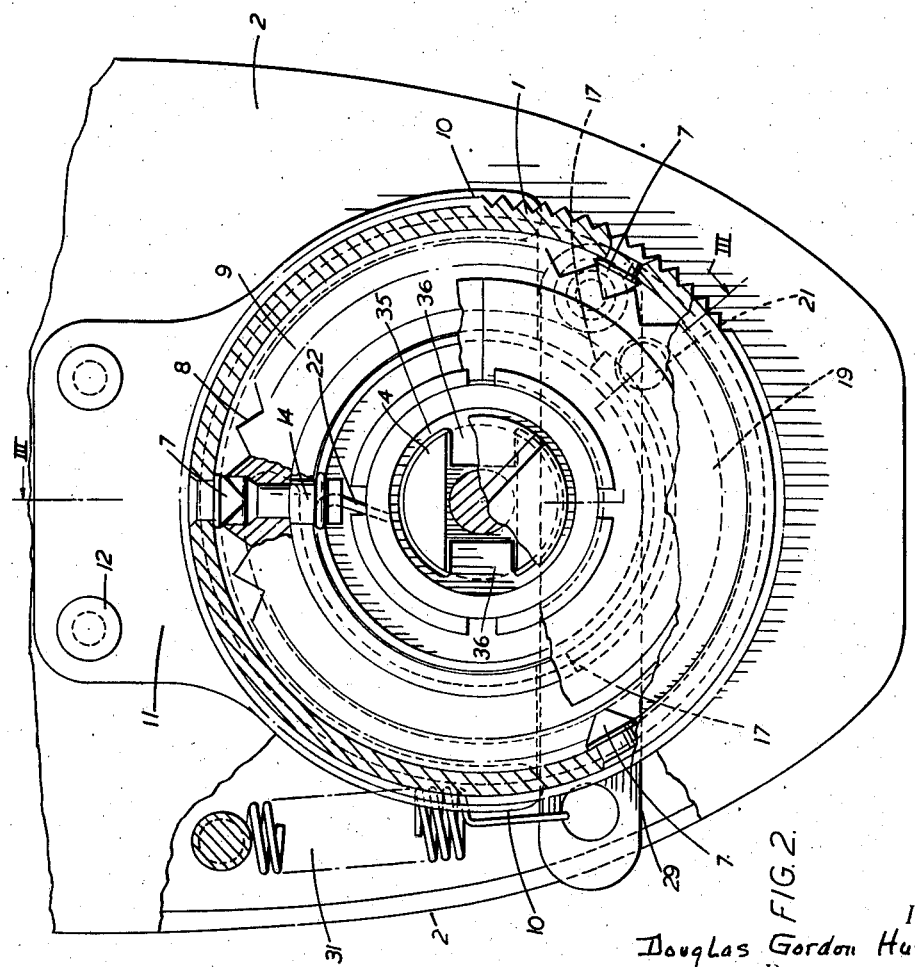
Inventor
Douglas Gordon Hunter
By
Attorney July 16, 1946.  D. G. HUNTER  2,404,291

ROLL-FILM WINDING MECHANISM

Filed April 12, 1944   3 Sheets-Sheet 3

Inventor
Douglas Gordon Hunter
By
Attorney

UNITED STATES PATENT OFFICE 2,404,291

ROLL-FILM WINDING MECHANISM

Douglas Gordon Hunter, London, England, assignor to Barnet Ensign Limited

Application April 12, 1944, Serial No. 530,607
In Great Britain May 4, 1943

9 Claims. (Cl. 242—71)

This invention relates to roll-film photographic cameras and in particular to film winding mechanism for such cameras.

In miniature cameras, owing to the small size of the film, it is necessary to ensure that the film is wound with great precision. This is sometimes effected by arranging the film winding mechanism to cooperate with the shutter winding knob so that the film is wound during the winding up of the shutter. In larger cameras, however, it is usual to provide an inspection window and to provide the back cover of the film with indicating marks so that the film is wound until the appropriate mark shows through the window.

The object of the present invention is to provide a film winding mechanism with an automatic stop so that the roll-film may be wound with accuracy without the need of an inspection window so that the winding becomes practically fool-proof and, if desired, the film may be wound while the camera is being set up and focussed.

According to the present invention the film winding mechanism for a roll-film camera is provided in the usual way with a winding knob by means of which the film spool is turned but it is arranged for a stop member to be clutched to the winding knob so as to be driven by the latter against the action of a spring and in this way the amount of rotation of the knob is limited to the amount required for winding a fresh exposure into position while the user of the camera is able to operate means to unclutch the stop member from the winding knob so that the stop member may be returned by the spring whereupon the winding mechanism is reset for a fresh operation. It is convenient to perform the unclutching by axial depression or sliding of the winding knob itself and to that end the stop member is made to turn about the latter until it is brought into engagement with a stationary stop fixed to the camera body. The return of the stop member when it is unclutched may be effected by a coiled wire spring anchored between the stop member and the fixed casing of the mechanism so that during the winding of a film the spring is wound up by the rotation of the stop member.

A convenient method of clutching the stop member to the winding knob consists in providing one of those parts with a toothed ring normally engaged by one or more teeth projecting from the other part and so arranged that on the winding knob sliding axially, the teeth are disengaged to unclutch the stop member.

In the larger cameras it is not convenient for the full feed necessary for the film to be effected by one rotation or less of the winding knob and to deal with this the stop member is formed in two or more interengaging parts with lost motion between them and in that event, on turning the winding knob, the part directly connected with it is first rotated until it takes up the lost motion between it and the one or more other parts whereupon the next part is driven and so on until finally the knob cannot be turned any further owing to the engagement with a fixed stop. A convenient arrangement consists of a stop member consisting of two coaxial parts, the one connected to the winding knob having a radial pin engaging in a peripheral recess in the second or inner part, and the latter having an arc-shaped groove into which a stop pin on the camera body projects. In such a case the returning spring may be a coiled spring anchored at one end to the said radial pin and at the other end to a part fixed to the camera body.

The invention will now be more fully described with reference to the accompanying drawings, in which:

Figure 1 is a side view of a camera in the closed position with the novel roll-film winding mechanism embodied in it;

Figure 2 is an elevation of the winding mechanism to an enlarged scale with parts of the casing removed to show certain of the internal elements;

Figure 3 is an axial section taken on the line III—III in Figure 2;

Figures 5 to 7 are transverse sections of certain parts of the winding knob and stop member to show the relative movements; while Fig. 8 is an elevation of a slightly modified form of the device shown to cooperate with the shutter release button.

Figure 4:
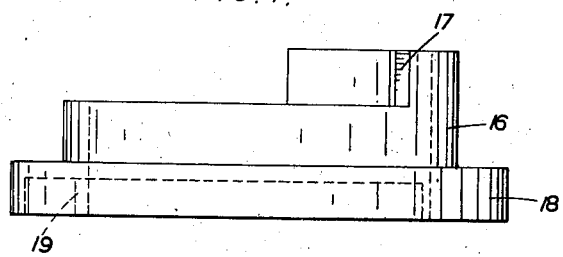
Figure 4 is an elevation of the second or inner part of the stop member.

In Figures 1 to 3 details of the winding mechanism are shown with the winding knob 1 mounted in the lower part of the side of the camera body 2. The winding knob 1 is prevented from sliding off the film winding stem 4 by the head of a set screw 3 which overlaps the recessed base 35 of the winding knob 1. The winding knob 1 is hollow, as seen in Figure 3, and is provided with a knurled rim 5 which has also a depending portion 6. In the form illustrated three triangular clutch teeth 7 are provided extending inwardly from the depending rim 6 of the winding knob 1. Three teeth are provided to prevent side play but naturally any other number may be employed and in certain cases one would be sufficient. These teeth normally engage an externally toothed ring 8 formed on the outer part 9 of the stop member. The winding knob 1 is arranged to be depressed and can slide axially, that is, to the right in Figure 3. To permit this and to provide a driving or key connection between the winding knob 1 and the film winding stem 4, the base 35 of the recessed portion of the winding knob 1 is formed with two inwardly extending lugs or tongues 36, best seen in Fig. 2; these tongues engage in opposite slots in the outer end of the film winding stem 4 which slots extend sufficiently along the winding stem 4 to permit the necessary axial inward movement of the winding knob 1. It will be noted that the toothed ring 8 is of limited depth so that during the said axial movement of the knob 1 the teeth 7 can leave the ring 8 with the result that the part 9 of the stop member is unclutched from the knob 1. Normally, however, the winding knob 1 is held in the clutched position by the prongs 10 of a plate-spring 11 riveted to the camera body 2 at 12 (Figures 1 to 3); these prongs 10 engage under a shoulder 13 of the knob 1 and are set as seen in Figure 3 to keep the teeth 7 in engagement with the toothed ring 8. By this arrangement simple pressure on the winding knob 1 unclutches the part 9 from it.

The outer part 9 of the stop member has a pin or peg 14 extending radially inwards into a recess or cutaway part 15 of an inner sleeve 16 which forms the second part of the rotary stop member. This recess 15 subtends an angle of about 225° at the axis of the winding spindle 4. The ends of the recess are shown at 17 in Figures 2 to 7. For the sake of clearness the extent of this cut-away part 15 is shown shaded in Figures 5 to 7 while in Figure 4 the external shape of the inner sleeve 16 is shown clearly. There is, therefore, a lost motion of nearly 225° between the parts 9 and 16 of the stop member. The inner sleeve 16 has a disc-shaped base 18, seen clearly in Figures 3 and 4, which rests on a flat plate 20 recessed into and secured to the camera body 2. A stop in the form of a pin 21 projects into the arc-shaped groove 19. A coiled torsion spring 22 has its outer end hooked over the radial pin 14 to engage a groove 23 therein, while its inner end projects into a slot 24 in a boss upstanding from the fixed plate 20 so that if the winding knob 1 is turned counterclockwise, as seen in Figures 2 and 5 to 7, the spring 22 is wound up.

Figure 5:
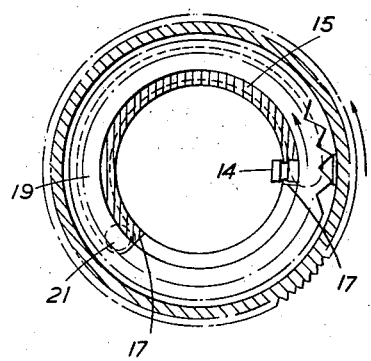
Figure 6:
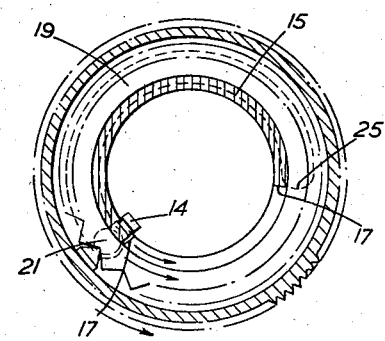
Figure 7:
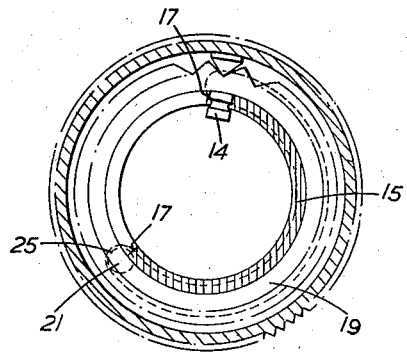

In operation, during the said rotation of the winding knob 1, the latter through the teeth 7 and toothed ring 8 rotates the outer sleeve 9 until the pin 14 of the latter encounters the inner sleeve 16 at the end 17 of the cut-away part 15. In Figure 5 the normal position when these parts are at rest is shown and the movement just referred to is shown in Figure 6 in which the pin 14 has left the end 17 of the cut-away part 15, shown on the right of Figures 5 and 6, and has travelled round with the outer sleeve 9 until in Figure 6, after turning through nearly 225°, it has reached the end 17 of the cut-away part 15 shown on the left of Figures 5 and 6. Then on further rotation of the winding knob 1 the pin 14 drives the inner sleeve 16 which continues to rotate until it is stopped by the end of the groove 19 meeting the fixed stop pin 21. This movement is shown in Figures 6 and 7 for in Figure 6 the fixed stop pin 21 is shown in contact with the left-hand end of the groove 19 in the inner sleeve 16. In passing from Figure 6 to Figure 7, however, the sleeve 16 has turned until the right-hand end 25 of the groove 19 has reached the fixed pin 21 whereupon the film has been wound exactly the correct amount.

As already pointed out, during this turning of the winding knob 1 the coiled spring 22 has been wound up. If now the winding knob 1 is depressed against the action of the plate-spring 11 the two sleeves 9, 16, forming the stop member are unclutched from the winding knob 1 in the manner already described and are therefore free to be turned back by the spring 22 as the latter unwinds and then when the winding knob 1 is again released the teeth 7 engage the ring 8, the parts are re-set and the knob 1 is ready to wind the film for yet another exposure.

In order to allow an exposed spool of film 26 to be removed and a fresh spool to be inserted, it is necessary to withdraw ribs 27 from the slot in the end of the spool 26. These ribs 27 are formed on a part 28 screwed into the inner end of the winding stem 4, as shown in Figure 3. Normally, however, the stem 4 and the ribs 27 cannot be retracted because a pivoted catch plate 29 (Figures 1 to 3) is held in engagement with a peripheral groove 30 in the winding stem 4 by a coiled tension spring 31. As can be seen from Figures 1 and 2, however, the end of the catch plate 29 extends slightly through a slot in the camera body 2 and can be retracted by the thumb of one hand whereupon the winding knob 1 can be pulled out by the other hand sufficiently to release the exposed spool 26. This spool can be removed and a fresh spool inserted in its place when the winding knob 1 is pushed in for the ribs 27 to engage the fresh spool. The parts are then ready for winding the fresh spool of film.

In Figure 8 a slight modification is shown. The shutter operating button 32 is shown by the side of the winding knob 1 as in Figure 1, but whereas in Figure 1 these two parts are shown to be independent, in Figure 8 the shutter button 32 is shown with a pair of arms 33 which engage in a groove 34 in the winding knob 1 so that when the latter is depressed and slides axially it also causes the shutter release button 32 to be operated in order to make the exposure. This action is satisfactory since normally the spring 11 is stronger than the return spring for the button 32. The arrangement shown in Figure 8 ensures that an exposure is made before the winding mechanism can be reset. It does not ensure that two exposures shall not be made on a single length of film but it does prevent the film being wound until the length of film last wound has been exposed.

What I claim is:

1. A film-winding mechanism for a roll-film photographic camera comprising in combination, a film spool stem journalled within the camera body, a winding knob in driving connection with said stem and protruding from the camera body, a stop member movably mounted on the camera body, a spring connected to said stop member for biasing same to a normal position, a clutch operatively connecting said winding knob to said stop member, a fixed stop coacting with said stop member for limiting the rotation of said winding knob and means permitting manual disengagement of said clutch thereby enabling the user to disconnect said stop member from said winding knob.

2. A film-winding mechanism for a roll-film photographic camera comprising in combination, a film spool stem journalled within the camera body, a winding knob in driving connection with said stem and protruding from the camera body, a stop member movably mounted on the camera body, a spring connected to said stop member for biasing same to a normal position, interengaging teeth integral with said winding knob and said stop member for clutching said stop member to said winding knob and a fixed stop coacting with said stop member for limiting the rotation of said winding knob, said winding knob being axially slidable manually to permit disengagement of said teeth for disconnecting said stop member from said winding knob.

3. A film-winding mechanism for a roll-film photographic camera comprising in combination, a film spool stem journalled within the camera body, a winding knob in driving connection with said stem and protruding from the camera body, a stop member mounted for rotation coaxially with said winding knob, a spring connected to said stop member for biasing same to a normal position of rotation, a clutch operatively connecting said winding knob to said stop member, a fixed stop coacting with said stop member for limiting the rotation of said winding knob and means permitting manual disengagement of said clutch thereby enabling the user to disconnect said stop member from said winding knob.

4. A film-winding mechanism for a roll-film photographic camera comprising in combination, a film spool stem journalled within the camera body, a winding knob in driving connection with said stem, protruding from the camera body and formed with a depending peripheral rim, a stop member mounted within said depending rim for rotation coaxially with said winding knob, a spring connected to said stop member for biasing same to a normal position of rotation, interengaging teeth integral respectively with the inside of said depending rim and the outside of said stop member for clutching said stop member to said winding knob and a fixed stop coacting with said stop member for limiting the rotation of said stop member and said winding knob, said winding knob being axially slidable manually to permit disengagement of said teeth for disconnecting said rotary stop member from said winding knob.

5. A film-winding mechanism for a roll-film photographic camera comprising in combination, a film spool stem journalled within the camera body, a winding knob in driving connection with said stem and protruding from the camera body, a stop member mounted for rotation coaxially with said winding knob, a coiled wire spring anchored to the camera body and to said rotary stop member for biasing the latter to a normal position of rotation, a clutch operatively connecting said winding knob to said stop member, a fixed stop coacting with said stop member for limiting the rotation of said winding knob and means permitting manual disengagement of said clutch thereby enabling the user to disconnect said stop member from said winding knob.

6. A film-winding mechanism for a roll-film photographic camera comprising in combination, a film spool stem journalled within the camera body, a winding knob in driving connection with said stem, protruding from the camera body and formed with a depending peripheral rim, a stop member mounted within said depending rim for rotation coaxially with said winding knob, a coiled wire spring anchored to the camera body and to said rotary stop member for biasing the latter to a normal position of rotation, interengaging teeth integral respectively with the inside of said depending rim and the outside of said stop member for clutching said stop member to said winding knob and a fixed stop coacting with said stop member for limiting the rotation of said stop member and said winding knob, said winding knob being axially slidable manually to permit disengagement of said teeth for disconnecting said rotary stop member from said winding knob.

7. A film-winding mechanism for a roll-film photographic camera comprising in combination, a film spool stem journalled within the camera body, a winding knob in driving connection with said stem, protruding from the camera body and formed with a depending peripheral rim presenting a tooth projecting radially inwards, a stop member mounted within said depending rim for rotation coaxially with said winding knob and formed with a peripheral toothed ring engaged by said tooth, a spring connected to said stop member for biasing same to a normal position of rotation and a fixed stop coacting with said stop member for limiting the rotation of said stop member and said winding knob, said winding knob being axially slidable manually for disengaging said tooth from said toothed ring for disconnecting said rotary stop member from said winding knob.

8. A film-winding mechanism for a roll-film photographic camera comprising in combination, a film spool stem journalled within the camera body, a winding knob in driving connection with said stem and protruding from the camera body, a stop member comprising first and second parts movably mounted in the camera body with lost-motion between said parts, a clutch operatively connecting said winding knob to said first part of said stop member, a fixed stop coacting with said second part of said stop member for limiting the rotation of said winding knob, a spring connected to said first part of said stop member for biasing same to a normal position and for taking up the lost-motion between the parts thereof and means permitting manual disengagement of said clutch and thereby freeing said stop member from said winding knob to permit said spring to cause said stop member to move to the normal position.

9. A film-winding mechanism for a roll-film photographic camera comprising in combination, a film spool stem journalled within the camera body, a winding knob in driving connection with said stem, protruding from the camera body and formed with a depending peripheral rim, an outer sleeve mounted within said depending rim for rotation coaxially with said winding knob, a radial pin extending inwards from said sleeve, an inner sleeve mounted within said outer sleeve for rotation coaxially with said winding knob, formed with a peripheral recess engaged by said radial pin and with an arcuate groove in one end face thereof, a spring anchored to the camera body at one end and to said radial pin at the other end for biasing said outer and inner sleeves to a normal position of rotation, interengaging teeth integral respectively with the inside of said depending rim and the outside of said outer sleeve for clutching said outer sleeve to said winding knob and a fixed stop pin projecting axially from the camera body to engage said arcuate groove.

DOUGLAS GORDON HUNTER.